United States Patent [19]

Kokuryo et al.

[11] Patent Number: 4,839,532
[45] Date of Patent: Jun. 13, 1989

[54] CONTROL SYSTEM FOR VEHICULAR PASSIVE SEAT BELT ARRANGEMENT

[75] Inventors: Yoshiki Kokuryo, Yokohama; Sachiro Kataoka, Ebina; Tomokazu Inaba, Yokohama; Kazuyoshi Terunuma, Chofu; Toshiharu Asano, Tokyo, all of Japan

[73] Assignee: Nissan Motor Company, Ltd., Japan

[21] Appl. No.: 58,771

[22] Filed: Jun. 5, 1987

[30] Foreign Application Priority Data

Jun. 5, 1986 [JP] Japan ............................ 61-85537[U]

[51] Int. Cl.[4] ...................... B60R 22/04; B60R 22/48
[52] U.S. Cl. ................................... 307/10.3; 180/268; 280/801
[58] Field of Search .................... 307/105 B; 180/268, 180/269; 280/801, 802, 803, 804, 807, 808; 200/61.58 R, 61.61, 61.62, 330, 331, 332, 335

[56] References Cited

U.S. PATENT DOCUMENTS

| 3,866,944 | 2/1975 | Takahashi | 280/803 |
| 3,935,410 | 1/1976 | Howard | 200/332 |
| 4,235,455 | 11/1980 | Collins et al. | 280/803 |
| 4,321,979 | 3/1982 | Kuroyama et al. | 180/268 |
| 4,410,061 | 10/1983 | Terabayashi | 307/105 B X |
| 4,411,448 | 10/1983 | Takada | 307/105 B X |
| 4,553,625 | 11/1985 | Tsuge et al. | 180/268 |

FOREIGN PATENT DOCUMENTS

| 2369947 | 7/1978 | France | 307/105 B |
| 58-36745 | 3/1983 | Japan | 180/268 |
| 58-98256 | 7/1983 | Japan . | |
| 59-121262 | 8/1984 | Japan . | |
| 59-195973 | 11/1984 | Japan . | |
| 59-206571 | 11/1984 | Japan . | |

Primary Examiner—Bentsu Ro
Attorney, Agent, or Firm—Leydig, Voit & Mayer

[57] ABSTRACT

A control system for a passive seat belt arrangement of an automotive vehicle. A drive motor of the control system is in an electric circuit and adapted to operate the seat belt arrangement to release a vehicle occupant from its restraint upon being supplied with electric current. Electric current supply to the motor is accomplished by closing a handle switch in the electric circuit. The handle switch is adapted to be closed when a door inside handle is operated by a vehicle occupant who intends to open a vehicle door to get off the vehicle, thereby preventing the vehicle occupant from being released from restraint with the seat belt arrangement in case the door is opened contrary to the occupant's will. A speed-sensitive preventing means for preventing the drive motor from being energized when the vehicle is moving.

5 Claims, 5 Drawing Sheets

CONTROL SYSTEM FOR VEHICULAR PASSIVE SEAT BELT ARRANGEMENT

BACKGROUND OF THE INVENTION

1. Field of the Invention

The present invention relates to an improvement in a vehicular passive seat belt arrangement for selectively automatically restraining a vehicle occupant and releasing the occupant from restraint, and more particularly to a control system for such a passive seat belt arrangement to prevent its malfunction so as to improve safety for the vehicle occupant.

2. Description of the Prior Art

Recently passive seat belt arrangement has been increasingly mounted on automotive vehicles. A typical passive seat belt arrangement is configurated as follows: An upper end section of a seat belt is movably engaged with a guide rail extending in the fore-and-aft direction of the vehicle, so that the seat belt upper end section is selectively driven forward and rearward, i.e., toward its restraining position at which the vehicle occupant is restrained by the seat belt and toward its releasing position at which the vehicle occupant is released from restraint. Such driving of the seat belt is carried out in response to ON-OFF actions of a door switch adapted to be turned ON and OFF respectively when the door is opened and closed. This driving control manner is adopted upon paying attention to the fact that the door is necessarily opened when the vehicle occupant gets off the vehicle while closed during vehicle cruising, i.e., the seat belt arrangement is controlled t release the vehicle occupant from restraint upon the door switch being turned ON when the door is opened, while to restrain the vehicle occupant upon the door switch being turned OFF when the door is closed.

However, with such a conventional control manner of the passive seat belt arrangement, even in case the door is opened contrary to the vehicle occupant's will, for example, owing to trouble of a door locking device, the door switch is turned ON and accordingly the seat belt upper end section is unavoidably moved to the releasing position at which the seat belt arrangement releases the vehicle occupant from restraint. This is because the driving control of the passive seat belt arrangement is made only in accordance with ON-OFF actions of the door switch. Such a control manner provides a possibility of the vehicle occupant being released from restraint with the seat belt arrangement during vehicle cruising, and therefore very dangerous for the vehicle occupant.

SUMMARY OF THE INVENTION

A control system for a vehicular passive seat belt arrangement according to the present invention is comprised of a driving device for operating the seat belt arrangement and adapted to selectively takes first and second states which cause respectively the seat belt arrangement to be put in a restraining state to restrain a vehicle occupant and a releasing state to release the vehicle occupant from restraint. Additionally, a switch device is provided to cause the driving device to take the second state when a door inside handle is operated by the vehicle occupant who intends to open a vehicle door. The door inside handle is installed to the door and located to be operated by the vehicle occupant within a vehicle passenger compartment.

Accordingly, the passive seat belt arrangement is operated to take its releasing state only when the vehicle occupant operates the door inside handle to intend to open the door. That is to say, the passive seat belt arrangement cannot release the vehicle occupant from restraint as long as the door inside handle is not operated, even if the vehicle door is opened contrary to the occupant's will owing to accidents such as vehicle collision and door locking device trouble. Thus, the passive seat belt arrangement can be operated to take the releasing state only when the vehicle occupant operates the door inside handle with an intention to open the door and gets off the vehicle, and therefore there is no possibility of the seat belt arrangement releasing the vehicle occupant from its restraint in case the door opens contrary to the occupant's will.

DETAILED DESCRIPTION OF THE INVENTION

Figure 1:
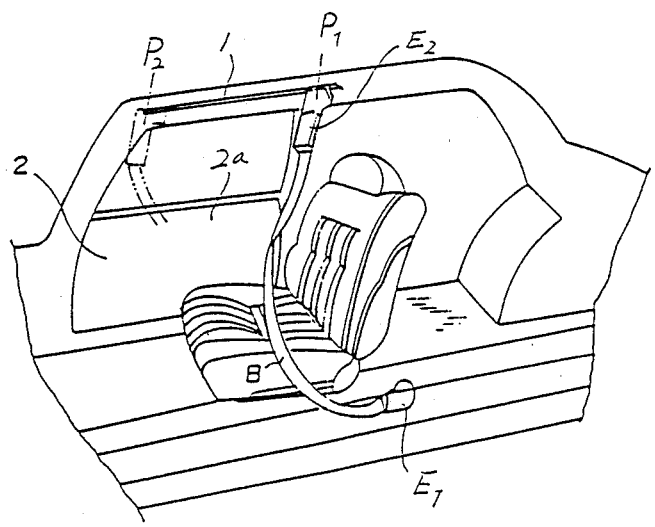
FIG. 1 is a fragmentary perspective illustration of a passive seat belt arrangement installed in a passenger compartment of an automotive vehicle, with which a control system for the passive seat belt arrangement of the present invention is to be combined.

Referring now to FIG. 1, there is shown an example of a passive seat belt arrangement for an automotive vehicle, with which a first embodiment of a seat belt arrangement control system according to the present invention is combined. The seat belt arrangement includes a seat belt B having a lower end section $E_1$ anchored to a vehicle floor and a upper end section $E_2$ movably engaged with a guide rail 1 extending in the fore-and-aft direction of the vehicle. Accordingly, the seat belt upper end section $E_2$ is selectively movable rearward to reach its restraining position $P_1$ to restrain a vehicle occupant (not shown) in a seated state while forward to reach its releasing position $P_2$ to release the vehicle occupant from restraint. Control of such movement of the seat belt B is carried out under the action of the control system shown in FIGS. 2 to 6.

Figure 2:
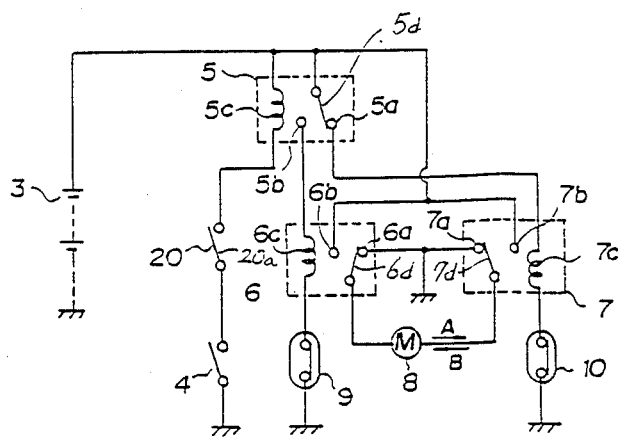
FIG. 2 is a circuit diagram of an embodiment of the control system of the present invention, which system is to be combined with the passive seat belt arrangement of FIG. 1.
Figure 3:
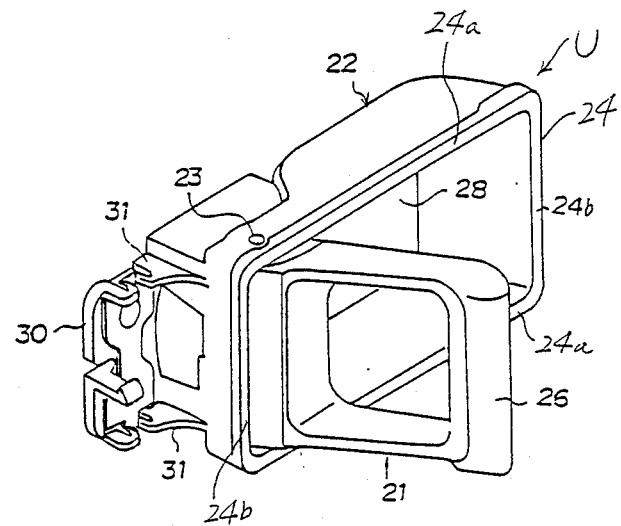
FIG. 3 is a perspective view of a door inside handle unit including a door inside handle forming part of the control system of FIG. 2.

The control system comprises an electric circuit as shown in FIG. 2, which circuit includes a door switch 4 adapted to make its ON-OFF actions in accordance with opening and closing operations of a vehicle door 2 shown in FIG. 1. A handle switch 20 is connected in series with the door switch 4 and adapted to make its ON-OFF actions in accordance with operation of a door inside handle 21 discussed after. The handle switch 20 is connected in series with a solenoid coil 5c of a relay switch 5 which coil is connected in series with a battery or power source 3. The relay switch 5 has first and second stationary contacts 5a, 5b to which a movable contact 5d selectively contacts. The stationary contact 5b is connected in series with a solenoid coil 6c of a relay switch 6 which has first and second stationary contacts 6a, 6b to which a movable contact 6d selectively contacts. The second stationary contact 6b is connected in series with a second stationary contact 7b of a relay switch 7 which has a first stationary contact 7a connected in series with the first stationary contact 6a of the relay switch 6, in which a movably contact 7d selectively contacts the first and second stationary contacts 7a, 7b. The relay switch 7 has a solenoid coil 7c connected in series with the first stationary contact 5a of the relay switch 5. The second stationary contacts 6b, 7b of the relay switches 6, 7 are connected in series with the battery 3.

An electric motor 8 is connected in series with the movable contacts 6d, 7d of the relay switches 6, 7 and adapted to be able to selectively make its normal and reverse rotations thereby to move the upper end section $E_2$ of the belt B of the passive seat belt arrangement in the forward and rearward directions of the vehicle. A limit switch 9 is connected in series with the solenoid coil 6c of the relay switch 6 and adapted to be turned OFF when the belt upper end section $E_2$ reaches the releasing position $P_2$ at which the passive seat belt arrangement is in a state to release the vehicle occupant from restraint. Additionally, another limit switch 10 is connected in series with the solenoid coil 7c of the relay switch 7 and adapted to be turned OFF when the belt upper end section $E_2$ reaches the restricting position at which the passive seat belt is in a state (as shown in FIG. 1) to restrain the vehicle occupant on the seat.

As illustrated in FIGS. 3 to 6, the door inside handle 21 forming part of a door inside handle unit U is pivotally supported through a pivot shaft 23 to a base member 22 secured to an inner door panel 2a in FIG. 1 so that the door inside handle is operated by the vehicle occupant located within a passenger compartment and seated on the seat. The handle switch 20 (a micro switch) is installed at the base member 22 in such a manner as to make its ON-OFF actions in accordance with operation of the door inside handle 21. The base member 22 is generally of the rectangular container shape and includes a surrounding wall sections 24 and a bottom wall section 28. The surrounding wall section is made up of two longer opposite parallel walls 24a, 24a and two shorter opposite parallel walls 24b, 24b. The pivot shaft 23 is disposed to bridge the two walls 24a, 24a. The door inside handle 21 is always biased in the direction of an inoperative or retracted position indicated by solid line in FIG. 4 under the action of a spring 23 mounted on the pivot shaft 23. The door inside handle 21 includes a generally C-shaped finger catching section 26 into which fingers of the vehicle occupant are hooked to raise the door inside handle 21 from the inoperative position to an operative position as indicated in phantom in FIG. 4. Additionally, the door inside handle 21 includes a foot section 27 extending in the opposite direction of the finger catching section 26 relative to a base section (no numeral) at which the pivot shaft 23 is disposed.

An installation section 30 is integrally formed with the bottom wall section 28 through side walls 31, 31 projecting in the longitudinal direction of the base member 22. The installation section 30 projects from the end portion on the side of the pivot shaft 23 and extend in the longitudinal direction of the base member 22. The installation section 26 is formed with openings 29, 29 through which the base member 22 is bolted to the door 2. The handle switch 20 is fixedly secured through a bracket 32 to the side wall 31 with bolts 33 and nuts 34. Additionally, the bottom wall section 28 of the base member 22 is formed with a cut-out opening 35 through which the foot section 27 of the door inside handle 21 is projectable backward of the bottom wall section 28. The foot section 27 is provided with a contact portion 27a which can contact with or separate from a movable contact 20a of the handle switch 20. In this connection, the movable contact 20a of the handle switch 20 is positioned in the locus of rotation of the contact portion 27a. around the pivot shaft 23. As a result, upon the vehicle occupant's pulling and releasing actions of the door inside handle 21, the contact portion 27 makes its advance and withdrawal movements relative to the movable contact 20a of the handle switch 20. In other words, when the door inside handle 21 is operated toward the operative position as indicated in phantom in FIG. 4, the movable contact 20a of the handle switch 21 is pushed by the foot section 27, so that the handle switch 20 is turned ON. When the door inside handle 21 is moved back toward the inoperative position as indicated by the solid line in FIG. 4 under the bias of the spring 25, the foot section 27 separates from the movable contact 20a of the handle switch 20, so that the handle switch 20 is turned OFF. The handle switch 20 is connected to a connector 36 through wires 37 covered with a tube- 38 for wire protection purpose.

The manner of operation of the thus arranged control system for the passive seat belt arrangement will be discussed hereinafter.

When the vehicle occupant hooks his fingers into the finger catching section 26 of the door inside handle 21 and pulls it to rotate around the pivot shaft 23 in order to open the door 2, door lock by a door locking device (shown in FIG. 7) is released while allowing the contact portion 27a of the door inside handle foot section 27 to be brought into contact with the movable contact 20a of the handle switch 20, so that the movable contact 20a is pushed thereby to turn the handle switch 20 ON. Then, the door 2 is opened so that the door switch 4 is turned ON thereby allowing electric current to pass through the solenoid coil 5c of the relay switch 5 in the electric circuit shown in FIG. 2. This causes the movable contact 5d to be brought into contact with the stationary contact 5b, which allows electric current to pass through the solenoid coil 6c of the relay switch 6. This moves the movable contact 6d to come into contact with the stationary contact 6b, thereby producing electric current flow in a direction of an arrow A, i.e., in a direction from the stationary contact 6b of the relay switch 6 toward the stationary contact 7a of the relay switch 7. As a result, the belt upper end section $E_2$ moves forward in FIG. 1. When the belt upper end section $E_2$ reaches the releasing position $P_2$, the limit switch 9 is turned OFF thereby interrupting electric current flow to the solenoid coil 6c of the relay switch 6, so that the movable contact 6d separates from the stationary contact 6b thus to stop the electric motor 8. It will be understood that the door inside handle 21 is so adapted as to be operated to the operative position only when the vehicle occupant intends to open the door, and therefore the belt upper end section $E_2$ never moves to the releasing position $P_2$ to release the vehicle occupant from restraint by the seat belt arrangement even when the door is opened constrary to the vehicle occupant's will owing to accident such as trouble of the door locking device or vehicle collision. Additionally, the series connection between the door switch 4 and the handle switch 20 prevents the sea belt arrangement from releasing the vehicle occupant from restraint even if the door inside handle is erroneously operated during vehicle cruising, because of the fact that the door switch 4 remains closed. This further improves safety for the vehicle occupant.

Figure 4:
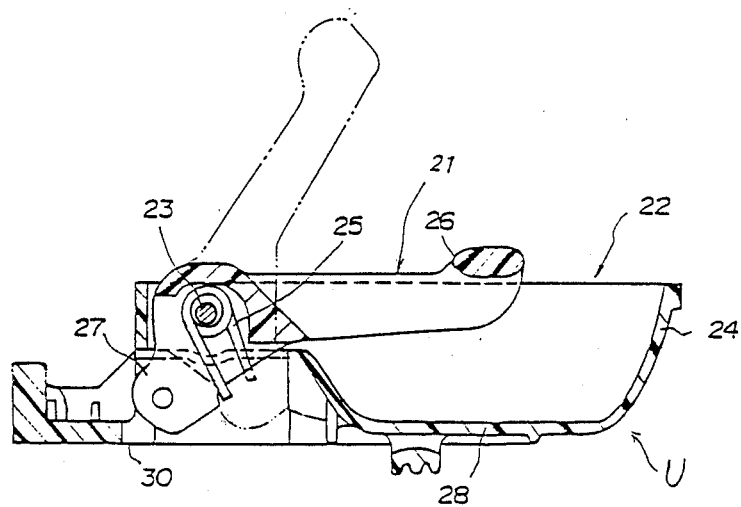
FIG. 4 is a vertical sectional view of the door inside handle unit of FIG. 3.
Figure 5:
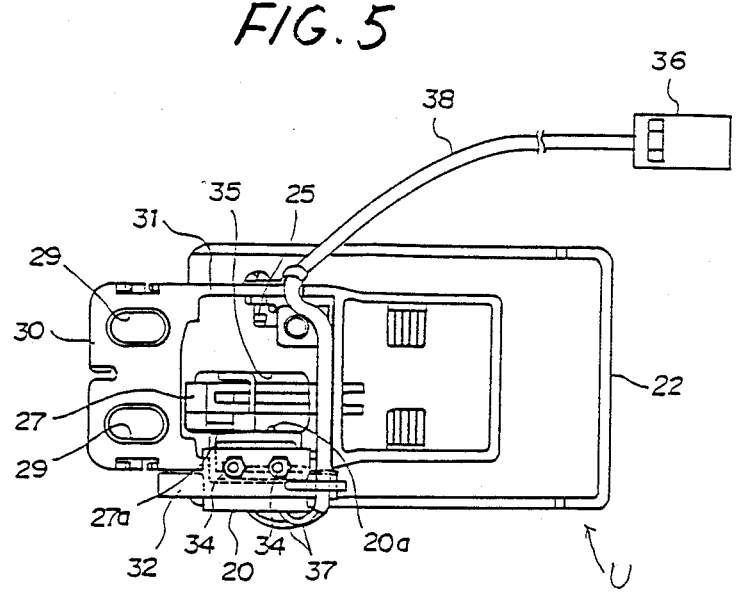
FIG. 5 is a bottom view of the door inside handle unit of FIG. 3.
Figure 6:
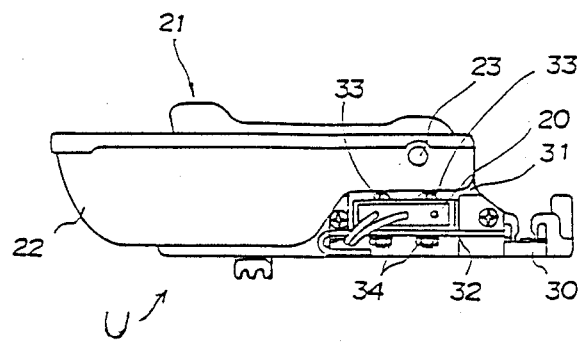
FIG. 6 is a side view of the door inside handle unit of FIG. 3.

When the vehicle occupant is seated on the seat while closing the door, the door switch 4 is switched OFF while the inside handle 21 is in the retracted position as indicated by solid line in FIG. 4 under the bias of the spring 25, so that the handle switch 20 is switched OFF. This interrupts electric current flow through the solenoid coil 5c of the relay switch in the electric circuit of FIG. 2. Consequently, the movable contact 5d is brought into contact with the stationary contact 5a thereby to allow electric current to flow through the solenoid coil 7c of the relay switch 7. This causes the movable contact 7d to come into contact with the stationary contact 7b, thus producing electric current flow in the direction of an arrow B, i.e., in a direction from the stationary contact 7b of the relay switch 7 toward the stationary contact 6a of the relay switch 6. Accordingly, the electric motor 8 is operated to move the belt upper end section $E_2$ rearward or toward the restraining position $P_1$ so that the seat belt arrangement restrains the vehicle occupant in position. When the belt upper end section $E_2$ reaches the restraining position $P_1$, the limit switch 10 is turned OFF thereby to interrupt electric current flow through the solenoid coil 7c of the relay switch 7. This causes the movable contact 7d of the relay switch 7 to separate from the stationary contact 7b, thereby stopping the electric motor 8. In this case, the control system for the passive seat belt arrangement is so arranged that the seat belt upper end section $E_2$ has been located at its releasing position $P_2$ before the vehicle occupant is seated on the seat. This is accomplished, for example, by operatively connecting the door inside handle 21 with a door outside handle (installed at the outside of the door and operable by a person positioned outside the vehicle) in such a manner that the door inside and outside handles are moved simultaneously and together with each other so that the handle switch 20 is turned ON when the door outside handle is operated to open the door. Otherwise, the door outside handle may be operatively connected to the handle switch 20 in such a manner as to allow the handle switch 20 to be turned ON when the door outside handle is operated to open the door.

While only the micro switch has been shown and described as being used as the handle switch 20 which makes its ON-OFF actions in accordance with operations of the door inside handle 21, it will be understood that other switches such as reed switch, pressure-responsive conducting rubber, hall device, hall IC and the like may be used in place of the micro switch.

Although the handle switch 20 has been shown and described as being installed to the base member 22 of the door inside handle 21, it will be understood that the installation position of the handle switch 20 may not be limited to there, and therefore the handle switch 20 may be installed at such a place as to make its ON-OFF actions in accordance with operations of the door inside handle 21, so that it may be installed to a door panel. In this connection, by virtue of installation of the handle switch 20 to the base member 22 as in the above-discussed embodiment, a space for installation of the handle switch 20 is saved while facilitating installation operation for the handle switch since detaching an inner liner and the like of the door is not required.

Figure 8:
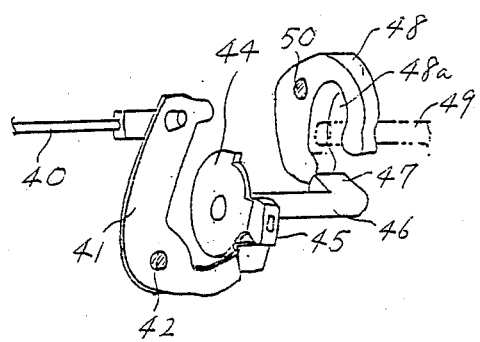
FIGS. 8 and 9 are perspective illustrations similar to FIG. 7 but showing different operational states of the mechanical connection of FIG. 7.
Figure 9:
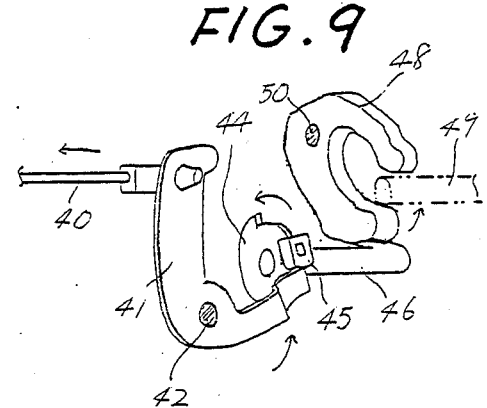

A mechanical connection of the door inside handle 21 and the door locking device for putting the door in its locked or unlocked state will be explained with reference to FIGS. 7 to 9.

Figure 7:
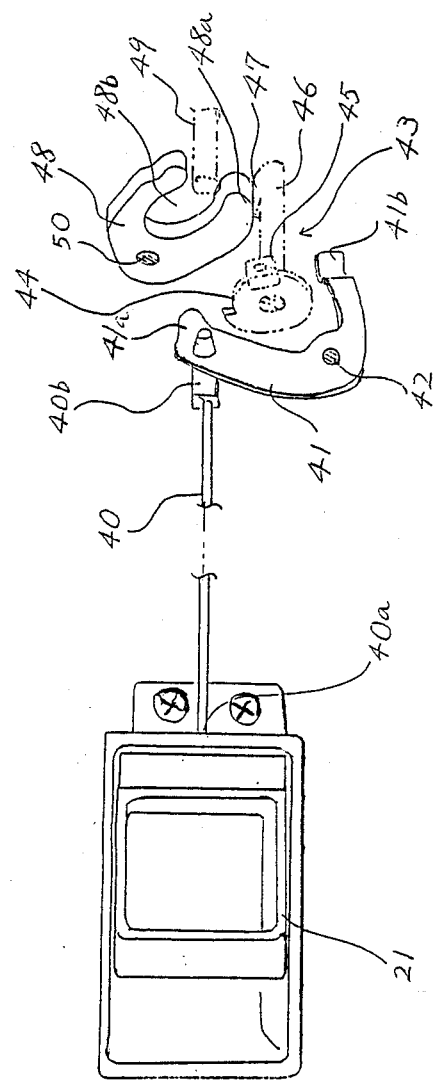
FIG. 7 is a perspective illustration showing a mechanical connection between the door inside handle of FIG. 3 and a door locking device.

As best shown in FIG. 7, the door inside handle 21 is connected through a connecting rod 40 to an inside lever 41. The inside lever 41 is generally C-shaped and mounted on a pivot pin 42 located at the middle part thereof so that the inside lever 41 swingably movable around the pin 42. The connecting rod 40 is pivotally secured at its one end 40a with the door inside handle 21 and at the other end section 40b with an end section 41b of the inside lever 41. The other end section 41b of the inside lever 41 is contactable with an arm section 45 formed on a cam plate 44 of an engagement member 43. A shaft 46 is fixed at its one end section to the cam plate 44 in such a manner that the axis of the shaft 7 is perpendicular to the cam plate 44. The other end section of the shaft 46 is formed with a pawl section 47 which is contactable with an end section 48a of a ratch member 48 forming part of the door locking device. The ratch member 48 is generally C-shaped and mounted at its central part on a pivot pin 50 so as to be swingable around the pivot pin 50. The C-shaped ratch member 48 is biased to be rotatable by a spring (not shown) and defines thereinside an inside space 48b in which a striker 49 is insertable. The striker 49 also forms part of the door locking device and installed on the side of a vehicle body. The door locking device is so arranged as to maintain the door in its locked state when the striker 49 is engaged with the ratch member 48 upon being inserted in the ratch member inside space 48b as shown in FIG. 8, while put the door in its unlocked state when the striker 49 is released from the ratch member 48 upon comming out of the inside space 48b as shown in FIG. 9. The ratch member 48 is always biased in a direction to allow the striker 49 to come out of the inside space 48, i.e., in a direction to release the striker 49.

Accordingly, when the door inside handle 21 is operated to open the door, the rod 40 is pulled in the direction of the door inside handle to rotate the inside lever 41 counterclockwise around the pin 42, so that the arm section 45 of the engagement member 43 is rotated upon being brought into engagement with the end section 41b of the inside lever 41. At this time, the pawl section 47 rotates along with the shaft 46 and therefore disengages with the end section 48b of the ratch member 48. In other words, the connection between the door inside handle 21 and the striker 49 changes from the state of FIG. 8 (in which the striker 49 is in engagement with the ratch member 48) to the state of FIG. 9 (in which the striker 49 is released from the ratch 48). Thus, the ratch member 48 automatically rotates round the pivot shaft 50 under the bias of the spring thereby to allow the striker 49 to come out of the ratch member inside space 48b. It is to be noted that FIG. 7 shows the state in which the ratch member 48 releases the striker 49, for example, in case of vehicle collision.

With this connection between the door inside switch 21 and the door locking device, even if the ratch member 48 is moved to its position to release the striker 49 thereby to open the door, for example, in vehicle collision, the door inside handle does not recieve any load from the ratch member 48 and therefore cannot be moved to its raised position as indicated in phantom in FIG. 4 since the inside lever 41 is independent and separatable from the engagement member 43.

Figure 10:
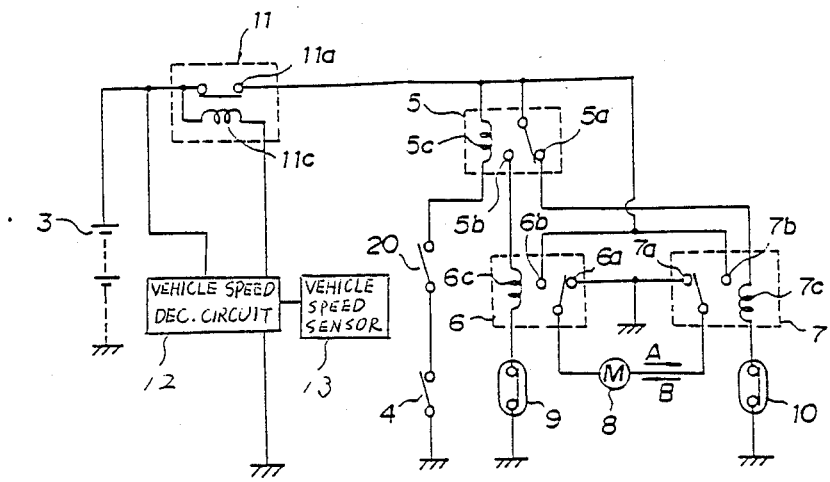
FIG. 10 is a circuit diagram similar to FIG. 2 but showing another embodiment of the control system for a passive seat belt arrangement, of the present invention.

FIG. 10 illustrates an electric circuit of another embodiment if the passive seat belt arrangement control system according to the present invention, in which the same reference numerals as in FIG. 2 designate the same elements and parts, omitting explanation of the same parts for the purpose of simplicity of illustration.

In this embodiment, a normally closed contact 11a of a relay switch 11 is connected between the battery 3 and the relay switch 5. A solenoid coil 11c of the relay switch 11 is connected in parallel with the normally closed contact 11a and connected to the battery 3. The solenoid coil 11c is connected in series with a vehicle speed decision circuit 12 to which a vehicle speed sensor 13 is connected. The vehicle speed decision circuit 12 is so arranged to maintain its non-conductive state when the vehicle speed sensor 13 detects zero vehicle speed during vehicle stopping while maintain its conductive state when the vehicle speed sensor 13 detects vehicle speeds during vehicle cruising.

With this arrangement, during vehicle stopping, the vehicle speed detected by the vehicle speed sensor 13 is zero, and therefore the vehicle speed decision circuit 12 is kept non-conductive so that no electric current is passed through the solenoid coil 11c of the relay switch 11. Accordingly, the normally closed contact 11a of the relay switch 11 is kept closed thereby maintaining closed state of the relay switch 11. Thus, the belt upper end section E$_2$ moves to the releasing position P$_2$ or to the restraining position P$_1$ in FIG. 1 like in the embodiment of FIG. 2.

During vehicle cruising, a certain vehicle speed is detected by the vehicle speed sensor 13 and therefore the vehicle speed decision circuit 12 is kept conductive, so that electric current is passed through the solenoid coil 11c of the relay switch 11. This opens the normally closed contact 11a thereby making the relay switch 11 in its opened state. Consequently, even when the door switch 4 and the handle switch 20 are turned ON upon vehicle occupant's erroneous operation during vehicle cruising, no electric current is passed through the solenoid coils 5c, 6c, 7c of the relay switches 5, 6, 7, so that the movable contacts 5d, 6d, 7d are kept in contact with the stationary contacts 5a, 6a, 7a, respectively. Accordingly, no electric current is passed through the motor 8, and therefore there is no possibility of movement of the belt upper end section E$_2$ from the restraining position P to the releasing position P$_2$ during vehicle cruising. Thus, the passive seat belt arrangement can securely restrain the vehicle occupant in position during vehicle cruising.

What is claimed is:

1. A control system for a vehicular passive seat belt arrangement comprising:
    driving means for operating the passive seat belt arrangement and selectively taking a restrained state in which the seat belt arrangement restrains an occupant to the vehicle and a released state in which the seat belt arrangement does not restrain the occupant, said driving means including an electric motor which operates in a first direction to put said driving means into the restrained state upon being supplied with a first directional current and in a second direction to put said driving means into the released state upon being supplied with a second directional current which is opposite in direction to the first directional current;
    a door handle installed on the inside of a door of the vehicle and located so as to be operable by the occupant and being operated when the occupant opens the door;
    switching means for enabling only the first directional current to flow through said electric motor when said door handle is not operated and enabling only the second directional current to flow through said electric motor when said door handle is operated; and
    speed-sensitive preventing means for preventing the second directional current from being supplied to said electric motor when the vehicle is moving.

2. A control system as claimed in claim 1 further comprising means for preventing the second directional current from being supplied to said electric motor when the door of the vehicle is closed.

3. A control system as claimed in claim 1 wherein said speed-sensitive preventing means comprises:
    a relay which is connected between a power supply and said electric motor so as to control the supply of power to said electric motor; and
    speed sensing means for sensing the speed of the vehicle and operating the relay so as to cut off the supply of power to said electric motor when the vehicle is moving.

4. A control system as claimed in claim 1 wherein:
    said switching means includes a handle switch which can be switched between a state in which said switching means enables only the first directional current to flow through said electric motor and a state in which said switching means enables only the second directional current to flow through said electric motor; and
    said door handle includes a finger-engaging section which can be engaged by the fingers of the occupant of the vehicle, a base section which is pivotably mounted on the door and which is integral with said finger-engaging section, and a projection which is integral with said base section and which projects from said base section in the opposite direction from said finger-engaging section and which is able to contact said handle switch.

5. A control system for vehicular passive seat belt arrangement comprising:
    driving means for operating the passive seat belt arrangement and selectively taking a restrained state in which the seat belt arrangement restrains an occupant of the vehicle and a released state in which the seat belt arrangement does not restrain the occupant, said driving means including an electric motor which operates in first direction to put said driving means into the restrained state upon being supplied with a first directional current and in a second direction to put said driving means into the released state upon being supplied with a second directional current which is opposite in direction to the first directional current;

a door handle installed on the inside of a door of the vehicle and located so as to be operable by the occupant and being movable between a closed position and an open position in which said door handle opens the door and being moved to its open position when the occupant opens the door;

switching means for enabling only the first directional current to flow through said electric motor when said door handle is in its closed position and enabling only the second directional current to flow through said electric motor when said door handle is moved to its open position, said switching means including a handle switch which is switched by said door handle to a state in which said switching means allows only said second directional current to flow through said electric motor when said door handle is moved to its open position;

first preventing means for preventing the second directional current form being supplied to said electric motor when the door of the vehicle is closed even when said handle switch is in a state in which said switching means allows only said second directional current to flow through said electric motor, said first preventing means including a door switch which is switched by the opening and closing of the door and is electrically connected to said handle switch such that current can not pass through said handle switch when the door is closed; and speed-sensitive preventing means for preventing the second directional current from being supplied to said electric motor when the vehicle is moving, said speed-sensitive preventing means including a relay which is connected between a power supply and said handle switch so as to control the supply of power to said handle switch and speed sensing means for sensing the speed of the vehicle and operating the relay so as to cut off the supply of power to said handle switch when the vehicle is moving.

* * * * *

UNITED STATES PATENT AND TRADEMARK OFFICE
CERTIFICATE OF CORRECTION

PATENT NO. : 4,839,532

DATED : June 13, 1989

INVENTOR(S) : Kokuryo et al.

It is certified that error appears in the above-identified patent and that said Letters Patent is hereby corrected as shown below:

Title page:

[73] Assignee: Nissan Motor Company, Ltd., Japan and
Kokusan Kinzoku Kogyo Kabushiki Kaisha, Japan Signed and Sealed this Fifteenth Day of May, 1990

Attest:

HARRY F. MANBECK, JR.

Attesting Officer

Commissioner of Patents and Trademarks